(12) United States Patent
Baker et al.

(10) Patent No.: US 8,862,912 B2
(45) Date of Patent: *Oct. 14, 2014

(54) POWER DISTRIBUTION INSIDE CABLE

(75) Inventors: Paul A. Baker, Los Altos, CA (US);
William O. Ferry, San Jose, CA (US);
James Orr, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,642

(22) Filed: Sep. 14, 2012

(65) Prior Publication Data

US 2013/0173936 A1   Jul. 4, 2013

Related U.S. Application Data

(63) Continuation of application No. 13/173,979, filed on Jun. 30, 2011, now Pat. No. 8,312,302.

(60) Provisional application No. 61/360,436, filed on Jun. 30, 2010, provisional application No. 61/360,432, filed on Jun. 30, 2010, provisional application No. 61/446,027, filed on Feb. 23, 2011.

(51) Int. Cl.
*G06F 1/26* (2006.01)
*G06F 3/14* (2006.01)
*G09G 5/00* (2006.01)

(52) U.S. Cl.
CPC ............ *G06F 1/266* (2013.01); *G09G 2370/04* (2013.01); *G09G 2370/12* (2013.01); *G06F 3/14* (2013.01); *G09G 2370/045* (2013.01); *G09G 2370/10* (2013.01); *G09G 5/006* (2013.01)
USPC .......................................... 713/300; 713/340

(58) Field of Classification Search
USPC ......................................... 713/300, 310, 340
See application file for complete search history.

(56) References Cited

U.S. PATENT DOCUMENTS 3,581,143 A   5/1971   Dornfeld
4,628,151 A   12/1986   Cardas
(Continued)

FOREIGN PATENT DOCUMENTS

CN   1168549 A   12/1997
CN   1351356 A   5/2002
(Continued)

OTHER PUBLICATIONS

Display Port, Wikipedia, the free encyclopedia, 4 pages; printed on Aug. 29, 2008 from http://en.wikipedia.org/wiki/Displayport; page states it was last modified on Aug. 25, 2008.

(Continued)

*Primary Examiner* — Paul Yanchus, III
(74) *Attorney, Agent, or Firm* — Kilpatrick Townsend & Stockton LLP

(57) ABSTRACT

Circuits, methods, and apparatus that provide for the powering of active components in connector inserts at each end of a cable may in various ways. For example, where a host is coupled to a device that is not self-powered, the host may provide power for circuitry at each end of the cable. In various embodiments of the present invention, the device may request higher voltage from the host, such that more power can be delivered. In these cases, the device may regulate the voltage received from the host to a lower voltage, and then provide the lower voltage to circuitry at one or both ends of the cable. Where the host is connected to a device that is self-powered, the host and the self-powered device may power their respective connector insert circuits.

16 Claims, 11 Drawing Sheets

(56) References Cited

U.S. PATENT DOCUMENTS

| | | | |
|---|---|---|---|
| 5,228,035 A | 7/1993 | Hirato et al. | |
| 5,313,465 A | 5/1994 | Perlman et al. | |
| 5,711,686 A | 1/1998 | O'Sullivan et al. | |
| 6,029,137 A | 2/2000 | Cordery et al. | |
| 6,169,251 B1 | 1/2001 | Grant et al. | |
| 6,485,335 B1 | 11/2002 | Dewdney | |
| 6,495,763 B1 | 12/2002 | Eichmann et al. | |
| 6,653,813 B2* | 11/2003 | Khatri | 320/103 |
| 6,677,534 B2 | 1/2004 | Yamamoto et al. | |
| 6,792,474 B1 | 9/2004 | Hopprich et al. | |
| 6,798,790 B1 | 9/2004 | Enssle et al. | |
| 6,998,538 B1 | 2/2006 | Fetterolf, Sr. et al. | |
| 7,033,219 B2 | 4/2006 | Gordon et al. | |
| 7,174,413 B2 | 2/2007 | Pettey et al. | |
| 7,188,209 B2 | 3/2007 | Pettey et al. | |
| 7,197,549 B1 | 3/2007 | Salama et al. | |
| 7,219,183 B2 | 5/2007 | Pettey et al. | |
| 7,255,602 B1 | 8/2007 | Driessen et al. | |
| 7,323,640 B2 | 1/2008 | Takahashi et al. | |
| 7,366,182 B2 | 4/2008 | O'Neill | |
| 7,369,388 B2 | 5/2008 | Cheung et al. | |
| 7,422,471 B1 | 9/2008 | Wu | |
| 7,447,922 B1 | 11/2008 | Asbury et al. | |
| 7,466,712 B2 | 12/2008 | Makishima et al. | |
| 7,480,303 B1 | 1/2009 | Ngai | |
| 7,561,855 B2 | 7/2009 | Hofmeister et al. | |
| 7,562,176 B2 | 7/2009 | Kloeppner et al. | |
| 7,587,575 B2 | 9/2009 | Moertl et al. | |
| 7,689,755 B2 | 3/2010 | Balasubramanian et al. | |
| 7,860,205 B1 | 12/2010 | Aweya et al. | |
| 7,944,200 B2 | 5/2011 | Endo et al. | |
| 8,312,302 B2 | 11/2012 | Baker et al. | |
| 8,327,536 B2 | 12/2012 | Kim et al. | |
| 8,380,912 B2 | 2/2013 | Jaramillo | |
| 8,463,881 B1 | 6/2013 | Baker et al. | |
| 8,516,238 B2 | 8/2013 | Cornelius et al. | |
| 8,683,190 B2 | 3/2014 | Cornelius et al. | |
| 2002/0010799 A1 | 1/2002 | Kubota et al. | |
| 2002/0093935 A1 | 7/2002 | Denny et al. | |
| 2003/0030720 A1 | 2/2003 | Hutchings | |
| 2003/0137997 A1 | 7/2003 | Keating | |
| 2004/0023645 A1 | 2/2004 | Olsen et al. | |
| 2004/0080544 A1 | 4/2004 | Stripling | |
| 2004/0115988 A1 | 6/2004 | Wu | |
| 2004/0196682 A1 | 10/2004 | Funaba et al. | |
| 2005/0044236 A1 | 2/2005 | Stafford | |
| 2005/0060470 A1 | 3/2005 | Main et al. | |
| 2005/0060480 A1 | 3/2005 | Solomon | |
| 2005/0111362 A1 | 5/2005 | Freytsis et al. | |
| 2005/0147119 A1 | 7/2005 | Tofano | |
| 2005/0238035 A1 | 10/2005 | Riley | |
| 2005/0262269 A1 | 11/2005 | Pike | |
| 2005/0281193 A1 | 12/2005 | Hofmeister et al. | |
| 2006/0023386 A1 | 2/2006 | Palinkas et al. | |
| 2006/0029038 A1 | 2/2006 | Jungck | |
| 2006/0083518 A1* | 4/2006 | Lee et al. | 398/155 |
| 2006/0092928 A1 | 5/2006 | Pike et al. | |
| 2006/0168387 A1 | 7/2006 | Gan et al. | |
| 2006/0200600 A1 | 9/2006 | Groso | |
| 2006/0206655 A1 | 9/2006 | Chappell et al. | |
| 2006/0288098 A1 | 12/2006 | Singh et al. | |
| 2007/0011536 A1 | 1/2007 | Khanna et al. | |
| 2007/0025481 A1 | 2/2007 | Ryu et al. | |
| 2007/0074891 A1 | 4/2007 | Burke | |
| 2007/0086487 A1 | 4/2007 | Yasuda et al. | |
| 2007/0208899 A1 | 9/2007 | Freking et al. | |
| 2008/0079462 A1 | 4/2008 | Chiu et al. | |
| 2008/0091857 A1 | 4/2008 | McDaniel | |
| 2008/0117909 A1 | 5/2008 | Johnson | |
| 2008/0123672 A1 | 5/2008 | Wilkinson | |
| 2008/0147898 A1 | 6/2008 | Freimuth et al. | |
| 2008/0172501 A1 | 7/2008 | Goodart et al. | |
| 2008/0195747 A1 | 8/2008 | Elmaliah | |
| 2008/0222338 A1 | 9/2008 | Balasubramanian | |
| 2008/0250175 A1 | 10/2008 | Sheafor | |
| 2008/0256445 A1 | 10/2008 | Olch et al. | |
| 2008/0279186 A1 | 11/2008 | Winter et al. | |
| 2008/0318348 A1 | 12/2008 | Grupen-Shemansky | |
| 2009/0003335 A1 | 1/2009 | Biran et al. | |
| 2009/0003361 A1 | 1/2009 | Bakthavathsalam | |
| 2009/0006710 A1 | 1/2009 | Daniel et al. | |
| 2009/0016348 A1 | 1/2009 | Norden et al. | |
| 2009/0022176 A1 | 1/2009 | Nguyen | |
| 2009/0037606 A1 | 2/2009 | Diab | |
| 2009/0063701 A1 | 3/2009 | Bagepalli et al. | |
| 2009/0070775 A1 | 3/2009 | Riley | |
| 2009/0117754 A1 | 5/2009 | Fields et al. | |
| 2009/0182917 A1 | 7/2009 | Kim | |
| 2009/0222924 A1 | 9/2009 | Droz et al. | |
| 2010/0014598 A1* | 1/2010 | Pfeifer | 375/257 |
| 2010/0046590 A1* | 2/2010 | Harper et al. | 375/211 |
| 2010/0085091 A1 | 4/2010 | Strazzieri et al. | |
| 2010/0185792 A1 | 7/2010 | Yao et al. | |
| 2011/0019383 A1 | 1/2011 | Aoyama et al. | |
| 2011/0167187 A1 | 7/2011 | Crumlin et al. | |
| 2011/0278043 A1 | 11/2011 | Ueda et al. | |
| 2012/0000703 A1 | 1/2012 | Kim et al. | |
| 2012/0000705 A1 | 1/2012 | Cornelius et al. | |
| 2012/0005394 A1 | 1/2012 | Goodart et al. | |
| 2012/0005496 A1 | 1/2012 | Baker et al. | |
| 2012/0103651 A1 | 5/2012 | Kim | |
| 2012/0104543 A1 | 5/2012 | Shahoian | |
| 2012/0106018 A1 | 5/2012 | Shahohian et al. | |
| 2012/0152613 A1 | 6/2012 | Kim et al. | |
| 2012/0182223 A1 | 7/2012 | Zeng et al. | |
| 2012/0215950 A1 | 8/2012 | Anderson | |
| 2012/0226774 A1 | 9/2012 | Hochsprung | |
| 2012/0233489 A1 | 9/2012 | Cornelius et al. | |

FOREIGN PATENT DOCUMENTS

| | | |
|---|---|---|
| CN | 101010833 A | 8/2007 |
| CN | 101248559 A | 8/2008 |
| CN | 201215850 Y | 4/2009 |
| CN | 201285827 Y | 8/2009 |
| CN | 101803121 A | 8/2010 |
| CN | 202678638 U | 1/2013 |
| CN | 202797544 U | 3/2013 |
| EP | 1 202 419 A1 | 5/2002 |
| EP | 2 090 955 A1 | 8/2009 |
| JP | H08265600 | 10/1996 |
| JP | 2001-109697 A | 4/2001 |
| JP | 2003-189263 A | 7/2003 |
| JP | 2005-521368 A | 7/2005 |
| JP | 2005-309744 A | 11/2005 |
| JP | 2006-048594 A | 2/2006 |
| JP | 2007-251779 A | 9/2007 |
| JP | 2008-252310 A | 10/2008 |
| JP | 2009-123561 A | 6/2009 |
| KR | 20090079879 A | 7/2009 |
| TW | 200303126 A | 8/2003 |
| TW | 589563 B | 6/2004 |
| TW | I239127 B | 9/2005 |
| TW | 200627322 A | 8/2006 |
| TW | 200838085 A | 9/2008 |
| TW | 200909825 A | 3/2009 |
| WO | 2006/102606 A2 | 9/2006 |
| WO | 2006/102606 A3 | 9/2006 |
| WO | 2007/099507 A2 | 9/2007 |
| WO | 2009/039287 A2 | 3/2009 |
| WO | 2009/039287 A3 | 3/2009 |
| WO | 2009/046617 A1 | 4/2009 |
| WO | 2009/086566 A1 | 7/2009 |
| WO | 2010/051281 A2 | 5/2010 |
| WO | 2010/051281 A3 | 5/2010 |
| WO | 2012/003347 A1 | 1/2012 |
| WO | 2012/003381 A2 | 1/2012 |
| WO | 2012/003385 A1 | 1/2012 |

OTHER PUBLICATIONS

Dopplinger, A., et al. "Using IEEE 1588 for synchronization of network-connected devices", Mar. 29, 2007, from www.embedded.com/columns/technicalinsights/, 7 pages.

(56) References Cited

OTHER PUBLICATIONS

Ethernet, Wikipedia, the free encyclopedia, 9 pages; printed on Aug. 17, 2008, from http://en.wikipedia.org/wiki/Ethernet; page states it was last modified on Aug. 17, 2008.
IDT 24-Lane 3-Port PCI Express, 89HPES24N3 Data Sheet, Jul. 18, 2006, 30 pages.
IEEE 1394 interface, Wikipedia, the free encyclopedia, 7 pages; printed on Jul. 24, 2008 from http://en.wikipedia.org/wiki/Firewire; page states it was last midified on Jul. 23, 2008.
International Preliminary Report on Patentability for PCT Application No. PCT/US2011/042689, mailed on Jan. 17, 2013, 7 pages.
International Preliminary Report on Patentability for PCT Application No. PCT/US2011/042634, mailed on Jan. 17, 2013, 13 pages.
International Search Report and Written Opinion, mailed on Jan. 31, 2012 for PCT Patent Application No. PCT/US2011/042684, 18 pages.
International Search Report and Written Opinion, mailed on Nov. 30, 2011 for PCT Patent Application No. PCT/US2011/042634, 20 pages.
International Search Report and Written Opinion, mailed on Sep. 28, 2011 for PCT Patent Application No. PCT/US2011/042689, 10 pages.
PCI Express Architecture, Chapter 3, Address Spaces & Transaction Routing, from PCIEX.book, pp. 105-152, Aug. 5, 2003.
PCI Express Base Specification Revision 1.0a, Apr. 15, 2003, pp. 1-426.
PCI Express, Wikipedia, the free encyclopedia, 11 pages; printed on Jul. 24, 2008 from http://en.wikipedia.org/wiki/PCI-Express; page states it was last modified on Jul. 16, 2008.
PCI-X, Wikipedia, the free encyclopedia, 4 pages; printed on Sep. 9, 2008 from http://en.wikipedia.org/wiki/PCI-X; page states it was last modified on Sep. 4, 2008.
Peer-to-peer, Wikipedia, the free encyclopedia, 11 pages; printed on Jul. 24, 2008 from http://en.wikipedia.org/wiki/Peer-to-peer; page states it was last modified on Jul. 24, 2008.
Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.
Universal Serial Bus, Wikipedia, the free encyclopedia, 17 pages; printed on Jul. 24, 2008 from http://en.wikipedia.org/wiki/USB; page states it was last modified on Jul. 23, 2008.
VESA DisplayPort Standard, Version 1, Revision 1a, Jan. 11, 2008, 238 pages.
Non-Final Office Action for U.S. Appl. No. 13/480,345, mailed Apr. 1, 2013, 6 pages.
Notice of Allowance for U.S. Appl. No. 12/239,743, mailed Feb. 19, 2013, 18 pages.
Notice of Allowance for U.S. Appl. No. 13/173,739, mailed May 13, 2013, 29 pages.
Notice of Allowance for U.S. Appl. No. 13/173,979, mailed on Jul. 11, 2012, 5 pages.
Final Office Action for U.S. Appl. No. 12/239,742, mailed on Oct. 15, 2010, 14 pages.
Final Office Action for U.S. Appl. No. 12/239,743, mailed on Nov. 12, 2010, 15 pages.
International Preliminary Report on Patentability for PCT Application No. PCT/US2011/042684, mailed on Jan. 17, 2013, 12 pages.
Non-Final Office Action for U.S. Appl. No. 12/239,742, mailed on Apr. 28, 2010, 14 pages.
Non-Final Office Action for U.S. Appl. No. 12/239,742, mailed on Dec. 7, 2012, 10 pages.
Non-Final Office Action for U.S. Appl. No. 12/239,743 mailed on Jun. 21, 2012, 15 pages.
Non-Final Office Action for U.S. Appl. No. 12/239,743, mailed on May 25, 2010, 10 pages.
Non-Final Office Action for U.S. Appl. No. 13/173,979, mailed on Mar. 15, 2012, 8 pages.
Notice of Allowance for U.S. Appl. No. 13/033,562, mailed on Aug. 8, 2012, 6 pages.
Office Action for European Patent Application No. 11743164.3, mailed Mar. 5, 2013, 2 pages.
Office Action for Japanese Patent Application No. 2012-543350, mailed on Nov. 19, 2012, in 4 pages.
Notice of Allowance for Japanese Patent Application No. 2012-543350, mailed on Mar. 12, 2013, in 3 pages.
Office Action for Chinese Patent Application No. 201120235164.4, mailed on May 4, 2012, with English translation, 2 pages.
Notice of Allowance for Chinese Patent Application No. 201120235164.4, mailed on Sep. 17, 2012, with English translation, 4 pages.
Final Office Action mailed on Jul. 8, 2013 for U.S. Appl. No. 12/239,742, 14 pages.
Non-Final Office Action mailed on Jul. 9, 2013 for U.S. Appl. No. 13/033,542, 16 pages.
Non-Final Office Action mailed on Jul. 9, 2013 for U.S. Appl. No. 13/033,553, 17 pages.
Office Action for Chinese Patent Application No. 201110189140.4, mailed on Aug. 19, 2013, 11 pages.
Office Action for Japanese Patent Application No. 2012-541240, mailed on Oct. 24, 2012, 3 pages.
Notice of Allowance for Japanese Patent Application No. 2012-541240, mailed on Apr. 30, 2013, 3 pages.
Notice of Allowance for Chinese Patent Application No. 201120235144.7, mailed on Mar. 1, 2012, with English Translation, 4 pages.
Non-Final Office Action mailed on Sep. 9, 2013 for U.S. Appl. No. 13/249,260, 21 pages.
Chinese Office Action mailed on Sep. 18, 2013 for CN Patent Application No. 201110189137.2, with English Translation, 14 pages.
Chinese Office Action mailed on Sep. 24, 2013 for CN Patent Application No. 201110189138.7, with English Translation, 10 pages.
Non-Final Office Action mailed on Oct. 3, 2013 for U.S. Appl. No. 13/403,209, 18 pages.
Salvator, Dave; "Business Wire on Intel Announces Thunderbolt Technology,"; Feb. 24, 2013, 3 pages.
Pang, Tiffany; TI Introduces High-Performance, Dual-Mode DisplayPort Switches and DHMI/DVI Level Translations; Connects new PC Video Standard to Monitors and TVs,; Mar. 11, 2008, 3 pages.
Texas Instruments; "DisplayPort Switch,"; Feb. 2008, 25 pages.
Texas Instruments; "DisplayPort Switch,"; Jan. 2008, revised Mar. 2008, 56 pages.
Notice of Allowance for U.S. Appl. No. 13/480,345, mailed Oct. 30, 2013, 26 pages.
Office Action for Korean Patent Application No. 10-2012-7032488, mailed on Oct. 31, 2013, with English translation, 6 pages.
Non-Final Office Action for U.S. Appl. No. 13/403,182, mailed Dec. 20, 2013, 14 pages.
Office Action for Taiwanese Patent Application No. 100123236, mailed on Feb. 19, 2014, with English translation, 4 pages.
Office Action for Taiwanese Patent Application No. 100123233, mailed on Feb. 19, 2014, with English translation, 7 pages.
Office Action for Taiwanese Patent Application No. 100123170, mailed on Feb. 20, 2014, 8 pages.
Office Action for Korean Patent Application No. 10-2012-7032475, mailed on Feb. 25, 2014, 6 pages.
Final Office Action for U.S. Appl. No. 13/033,553, mailed Mar. 10, 2014, 37 pages.
Office Action for Chinese Patent Application No. 201110189140.4, mailed on Mar. 28, 2014, 11 pages.

\* cited by examiner

| DP | T29 | Pin |
|---|---|---|
| HPD | HPD | 2 |
| CFG1 | HS0RX(P) | 4 |
| CFG2 | HS0RX(N) | 6 |
| GND | GND | 8 |
| DP3(p) | (RESERVED) GND | 10 |
| DP3(n) | (RESERVED) GND | 12 |
| GND | GND | 14 |
| AUX(p) | HS1RX(P) | 16 |
| AUX(n) | HS1RX(N) | 18 |
| DPPWR | DPPWR | 20 |

| Pin | T29 | DP |
|---|---|---|
| 1 | HV INPUT / ACGND | GND |
| 3 | HS0TX(P) | DP0(p) |
| 5 | HS0TX(N) | DP0(n) |
| 7 | GND | GND |
| 9 | LSR2P TX | DP1(p) |
| 11 | LSP2R Rx | DP1(n) |
| 13 | GND | GND |
| 15 | HS1TX(P) | DP2(p) |
| 17 | HS1TX(N) | DP2(n) |
| 19 | GND | GND |

FIGURE 3

POWER DISTRIBUTION INSIDE CABLE

CROSS-REFERENCES TO RELATED APPLICATIONS

This application is a continuation of U.S. patent application Ser. No. 13/173,979, filed Jun. 30, 2011, which claims the benefit of U.S. provisional patent applications Nos. 61/360,436, filed Jun. 30, 2010, 61/360,432, filed Jun. 30, 2010, and 61/446,027, filed Feb. 23, 2011, and is related to co-pending U.S. patent application Ser. No. 13/173,739, filed Jun. 30, 2011, titled Circuitry for Active Cable, which are incorporated by reference.

BACKGROUND

Electronic devices often include connectors to provide ports where power and data signals can be shared with other devices. These connectors are often designed to be compliant with a standard, such that the electronic devices can communicate with each other in a reliable manner. The various Universal Serial Bus (USB), Peripheral Component Interconnect Express (PCIe), and DisplayPort (DP) standards are but a few examples.

Often, devices communicate over cables. These cables may have a plug or insert on each end, which plug into receptacles in the devices. But the data rates of these standards are increasing tremendously, and new types of cables are needed in order for devices to communicate at these higher data rates.

To meet these increased data rates, active circuits may be included in the cable. But these active circuits need to be powered. It is typically undesirable to provide power to these cables using a source other than one of the connected devices. That is, it may be undesirable to power a first cable using a second cable.

For this reason, power may be provided to active circuits in a cable by the devices being connected by the cable. But these devices may have unequal power delivery capabilities. For example, a first device may be powered by a wall outlet, while a second device may derive its power from the first device. Also, various devices may provide various voltage levels.

Thus, what is needed are circuits, methods, and apparatus that power active circuits in a cable in an intelligent and configurable manner. It may also be desirable to reduce power by providing various states such as sleep and other lower power states.

SUMMARY

Accordingly, embodiments of the present invention provide circuits, methods, and apparatus that power active circuits in a cable in an intelligent and configurable manner.

In various embodiments of the present invention, the active components in connector inserts at each end of a cable may be powered in various ways. For example, where a host is coupled to a device that is not self-powered, the host may provide power for circuitry at each end of the cable. In various embodiments of the present invention, the device may request higher voltage from the host, such that more power can be delivered. In these cases, the device may regulate the voltage received from the host to a lower voltage, and then provide the lower voltage to circuitry at one or both ends of the cable. Where the host is connected to a device that is self-powered, the host and the self-powered device may power their respective connector insert circuits.

More specifically, in one embodiment of the present invention, a host may be coupled to communicate with a device that is not powered by a wall-outlet or other external power source, though in various embodiments of the present invention, the device may be powered by an internal or external battery. The host may provide a low-voltage supply to the device via the cable. Circuitry in the cable may be powered from this same low-voltage supply. The cable circuitry may include circuitry in a first cable plug connected to the host, and circuitry in a second cable plug connected to the device.

In another embodiment of the present invention, a host may provide a higher voltage to a device. This higher voltage may provide an increased amount of power to the device, and it may allow for faster charging of a battery in, or associated with, the device. But this higher voltage may not be needed to power cable circuits, and using the higher voltage may cause excess power dissipation in the cable. This higher power dissipation may, in turn, cause heating and an unpleasant user experience. Accordingly, the device may receive this higher voltage, and reduce the higher voltage to a lower voltage. This lower voltage may then be used to power the cable circuits. In this way, the circuitry needed to reduce the high voltage to a lower voltage is only included on devices that will use it, and it does not need to be included on every host device.

In another embodiment of the present invention, a host may be in communication with a device that is self-powered or powered by a wall outlet or other power source. In this case, the host and the device may each power circuitry in the plug that they are connected to.

In other embodiments of the present invention, signals compliant with one of multiple protocols may be provided on a cable. These embodiments of the present invention may provide circuitry to detect which protocol is being used. Also, embodiments of the present invention may provide circuitry to save power by turning off unused circuitry, and providing for sleep states during periods of inactivity.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 3 illustrates a pinout of a connector according to an embodiment of the present invention;

DESCRIPTION OF ILLUSTRATIVE EMBODIMENTS

Figure 1:
FIG. 1 illustrates a legacy system that may be improved by the incorporation of embodiments of the present invention.

FIG. 1 illustrates a legacy system that may be improved by the incorporation of embodiments of the present invention. This figure illustrates computer 110 in communication with legacy display 120 over legacy connection 115. In a specific embodiment of the present invention, legacy connection 115 is a DisplayPort connection, though in other embodiments of the present invention, other connections may be used.

In this figure, connection 115 is shown as a legacy connection. In other embodiments of the present invention, connection 115 may also be a new type of connection. Also, while computer 110 is shown communicating with display 120, other types of connections may be improved by the incorporation of embodiments of the present invention. For example, a connection may be provided between a portable media player and a display, a computer and a portable media player, or between other types of devices. In various embodiments of the present invention, computer 110, display 120, and the other devices shown or discussed may be manufactured by Apple Inc. of Cupertino, Calif.

Again, it may be desirable for computer 110 to be able to drive either a legacy display, such as display 120, or any newer computer, display, or other type of device. Typically, this requires the addition of another connector on computer 110. This may be undesirable, as it adds complexity, cost, and size to the computer 110. The addition of another connector may also increase consumer confusion.

Accordingly, embodiments of the present invention may provide a newer connection using the same connector as legacy connection 115. An example is shown in the following figure.

Figure 2:
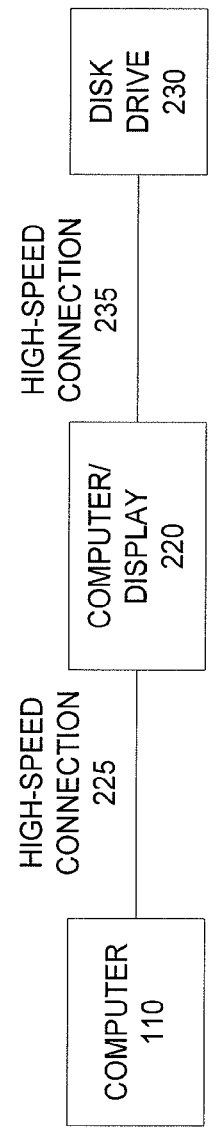
FIG. 2 illustrates a computer system according to an embodiment of the present invention.

FIG. 2 illustrates a computer system according to an embodiment of the present invention. This figure, as with the other included figures, is shown for illustrative purposes and does not limit either the embodiments of the present invention or the claims.

This figure illustrates computer 110 communicating with computer or display 220 over high-speed connection 225. Computer or display 220 communicates with disk drive 230 over high-speed connection 235. Computer 110 may use the same connector to form a legacy connection 115 in FIG. 1 and high-speed connection 225 in FIG. 2. As shown, the high-speed connection provided by computer 110 may be daisy-chained to multiple devices. In this configuration, each high-speed connection 225 and 235 shares the bandwidth available at the connector of computer 110.

By providing a connector on computer 110 that can support legacy connection 115 in FIG. 1 and high-speed connection 225 in FIG. 2, the number of connectors on computer 110 is reduced. This reduces device size, saves money, and eases consumer confusion. In this example, computer 110 communicates with computer or display 220 and disk drive 230. In other embodiments of the present invention, other types of devices may be employed. For example, computer 110 may drive a display of an all-in-one computer, a second computer, a stand-alone monitor, an expansion device, a raid drive, or other type of device.

An embodiment of the present invention may account for at least two considerations when arranging pinouts for a high-speed connection using an existing legacy connector. First, signals in different channels of the high-speed connection may be arranged such that they do not interfere with each other. That is, cross talk between high-speed signals may be reduced and the signals may be isolated. Second, circuitry to drive and receive the new, high-speed signals and circuitry associated with the legacy standard may be isolated to limit interference between them. An example is shown in the following figure.

FIG. 3 illustrates a pinout of a connector according to an embodiment of the present invention. In this example, DisplayPort is the legacy standard, which has been overlaid with pins for a new standard, referred to here as HSIO, and elsewhere in this document as T29. In other embodiments of the present invention, other standards may be used. Also, one or both of these standards may be legacy standards, or one or both of these standards may be newer standards. Also, while two standards are shown here as sharing a connector, in other embodiments of the present invention, other numbers of standards may share a connector.

In various embodiments of the present invention, the two standards may be separate and unrelated. In other embodiments of the present invention, they may be related. For example, HSIO may be a high speed signaling technique that carries DisplayPort information. That is, DisplayPort information may tunnel using HSIO signals. HSIO may also carry other types of signal information at the same time, such as PCIe information. In this way, the connector in FIG. 3 may carry DisplayPort signals directly, or it may carry DisplayPort information that is conveyed as HSIO signals. It should be noted that in various embodiments of the present invention described below, HSIO is also referred to as T29.

In this arrangement, the high-speed input and output pins may be isolated from one another. Specifically, high-speed receive signals may be placed on pins 4 and 6, and 16 and 18. Each of these pairs of signals may be isolated by signals that are AC grounds. For example, high-speed receive pins 4 and 6 may be isolated by hot plug detect pin 2 and ground pin 8. Similarly, high-speed receive pins 16 and 18 may be isolated by ground 14 and power pin 20. High-speed transmit pins 3 and 5, and 15 and 17, may be isolated by ground pins 1, 7, 13, and 19. Some or all of the ground pins, such as pins 1 and 7, may be AC grounds, as opposed to a direct DC connection to ground. That is, these pins may be coupled through a capacitor to ground. This provides a ground connection at high frequencies, while providing an open at low frequencies. This arrangement allows power supplies to be received at these pins, while maintaining a ground at high frequency.

In a specific embodiment of the present invention, pin 20 at a first end of cable connects to pin 1 at a second end of the cable. This allows power provided on pin 20 by a host device to be supplied to pin 1 at a device connection. Since pin 1 is coupled to ground through a capacitor, the DC power may be received, though pin 1 provides an AC ground.

Also in this arrangement, the high-speed signals in the high-speed HSIO standard may share pins with appropriate signals of the legacy DisplayPort standard. Specifically, the high-speed receive signals on pins 4 and 6 may share pins with configuration signals in the DisplayPort standard. High-speed receive signals on pins 16 and 18 may share pins with auxiliary signals in the DisplayPort standard. High-speed transmit signals on pins 3 and 5 may share pins with DisplayPort output signals, as may the high-speed transmit signals on pins 15 and 17.

Again, in various embodiments of the present invention, active cables may convey signals compliant with various standards. As discussed above, in a specific embodiment of the present invention, these may be referred to as HSIO and DisplayPort. The active cables may be able to determine which standards are being used by detecting the states of various pull-up or pull-down resistors. Examples of this may be found in co-pending U.S. patent application Ser. No. 13/173,739, titled Circuitry for Active Cable, which is incorporated by reference.

In various embodiments of the present invention, active cables may connect various types of electronic devices together. These electronic devices may include host devices and other types of devices. These other types of devices may include their own power supplies, or they may be powered by the host device. A device that has its own power supply may draw power from a battery, wall socket, car charger, or other supply. These devices may be devices such as disk drives, monitors, or other types of devices.

Again, a host according to an embodiment of the present invention may be capable of providing a higher voltage, such as 12 or 15V. In these circumstances, more power can be provided to a second device without increasing the maximum current. Components in the cable may not operate at the high voltage, so the second device may provide the lower voltage to the cable circuitry. Also, by providing the circuitry for generating the lower voltage on the second device, this circuitry does not need to be included in the host. An example is shown in the following figure.

Figure 4:
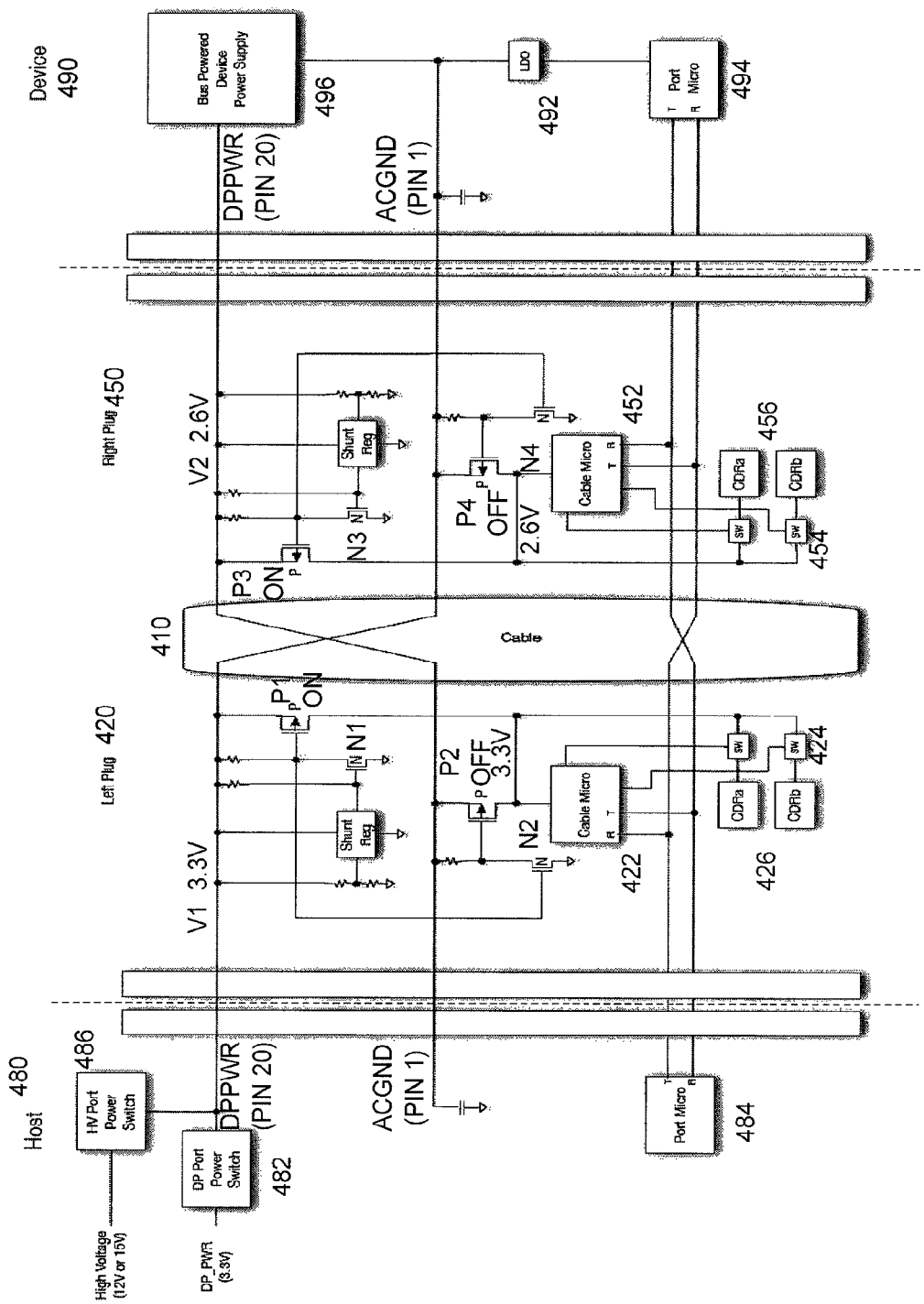
FIG. 4 illustrates an electronic system according to an embodiment of the present invention.

FIG. 4 illustrates an electronic system according to an embodiment of the present invention. This figure includes host 480 coupled to device 490 via cable 410. Cable 410 includes left plug 424 connected to host 480, and right plug 454 connected to device 490. Host 480 may be capable of providing one or more voltages to both device 490 and cable circuitry in cable 410. Host 480 may provide a lower voltage of 3.3 V, or a higher voltage of 12 or 15 volts. In other embodiments of the present invention, host 480 may provide various voltage levels to host 490 and cable circuitry in cable 410.

In this specific example, host 480 provides 3.3 V to the cable circuitry in cable 410 and device 490. Accordingly, switch 482 in host 480 provides 3.3 V as voltage V1. This voltage pulls up on the gate of transistor N1, thereby turning on transistors N1 and P1. Transistor P1 provides 3.3 V to cable microcontroller 422 and switches 424. This voltage further turns on the body diode of transistor P2, which pulls the voltage on line V2 to 2.6 V, or 3.3 V less one diode drop. This voltage turns on transistors N3 and P3, thereby connecting the voltage on line V2 to cable microcontroller 452 and switches 454. Transistors N4 and P4 are off, thereby isolating the voltage on line V2 from the voltage on line V1.

Voltage V1 is received by low-drop-out regulator 492 in device 490, which provides power to port microcontroller 494. The host port microcontroller 484 may then communicate with cable microcontrollers s 422 and 452 and port microcontroller 494 to determine proper configuration for the cable. In a specific embodiment of the present invention, the host port microcontroller 484 may check with device port microcontroller 494 to determine whether device 490 requires a higher level of power. If it does, host port microcontroller 484 may check with cable microcontroller 422 to determine whether the cable can support the delivery of this higher level of power. If device 490 requires higher power, and the cable can deliver it, then host 480 may provide the higher level of power. In another embodiment of the present invention, host port microcontroller 484 may determine how much power will be needed by the cable and device 490. In some circumstances, one link including one pair of clock and data recovery circuits, or other circuitry, may need to be powered off.

In this example, power supply 496 receives only 3.3 V on line V1 from host 480. At this voltage, power supply 496 may be in an under-voltage lock-out state, and may therefore be powered off. In this state, power supply 496 does not provide power to the cable circuitry.

In this example, the cable plug circuitry includes clock and data recovery circuits 426 and 456. These clock and data recovery circuits may receive and retime data received from host 480, device 490, and from each other. Examples of this can be found in co-pending U.S. patent application Ser. No. 13/173,739, titled Circuitry for Active Cable, which is incorporated by reference.

Again, host 480 is capable of providing a higher voltage, such as 12 or 15 V. In these circumstances, while it may be desirable to provide this higher voltage to device 490, this higher voltage may cause excess power dissipation, and thus heating, in circuitry of cable 410. Accordingly, in various embodiments of the present invention, while device 490 receives a higher voltage from host 480, device 490 in turn provides a lower voltage to the cable circuitry. This allows cable power dissipation to remain low. Also, by providing the circuitry for generating the lower voltage on device 490, this circuitry does not need to be included in host 480. Accordingly, in circumstances where host 480 does not need to provide this lower voltage, the circuitry is not wasted. Instead, the circuitry is only included on devices that need the higher voltages. An example is shown in the following figure.

Figure 5:
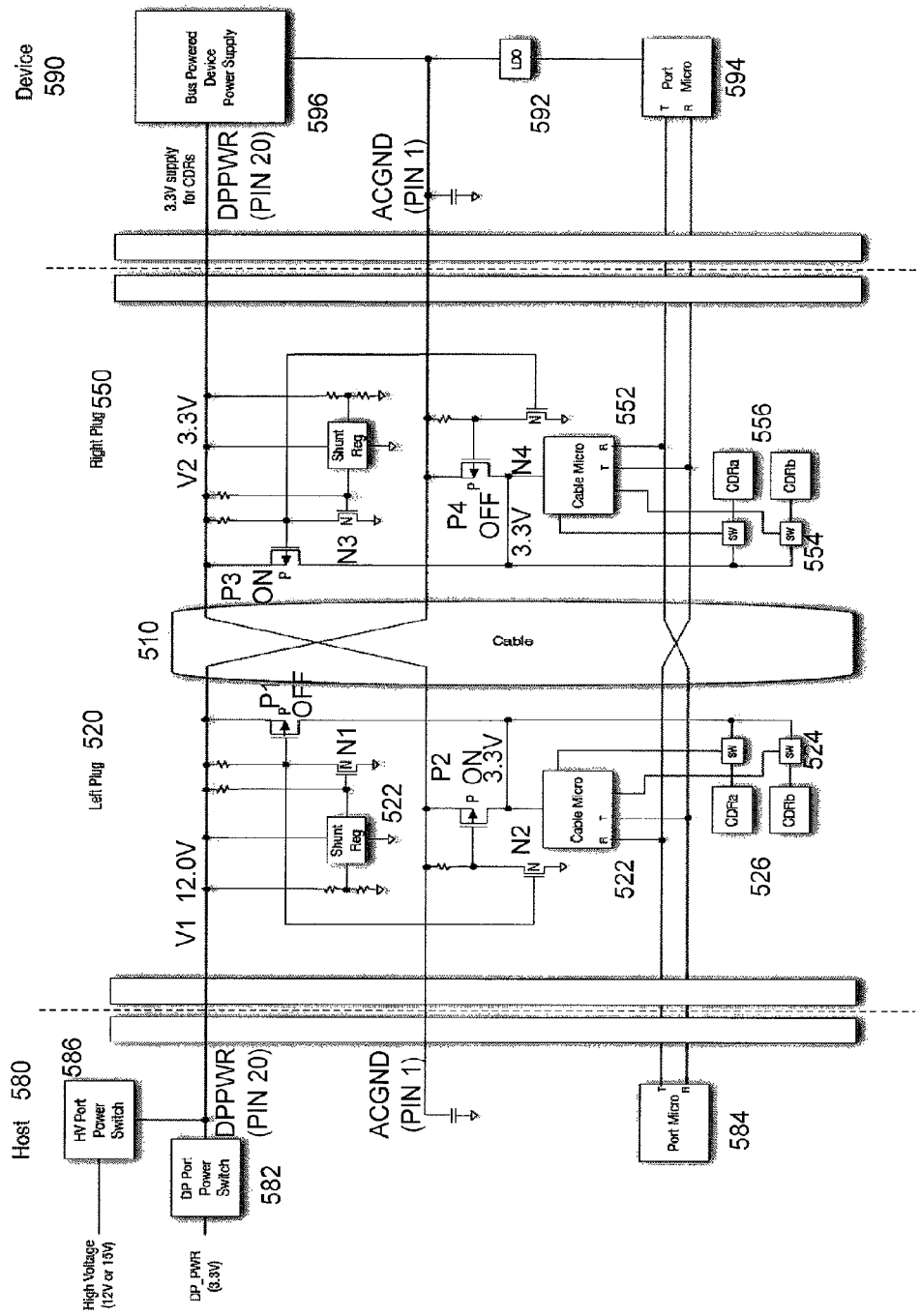
FIG. 5 illustrates an electronic system where a host provides a high voltage to a device via a cable.

FIG. 5 illustrates an electronic system where host 580 provides a high voltage to device 590 via cable 510. Again, providing a high voltage to cable circuitry in cable 510 may cause excessive power dissipation and component heating in left plug 520 and right plug 550. Accordingly, in this embodiment of the present invention, device 590 receives a higher voltage from host 580, and in turn provides a lower voltage to cable circuitry in cable 510. Either the higher voltage provided by the host 580, or the lower voltage generated by device 590, may be used to power device 590, charge a battery in or associated with device 590, or used for other purposes.

Specifically, high voltage power switch 586 in host 580 provides 12 V on line V1. This 12 V causes shunt regulator 522 to turn off transistors N1 and P1. The high voltage is received in device 590 by low-drop-out regulator 592, which provides a lower regulated voltage to port microcontroller 594. The higher voltage received by device 590 is regulated to a lower supply, such as 3.3 V, and provided on line V2 by power supply 596. This in turn may turn on transistor P3, which provides the voltage on line V2 to cable microcontroller 552 and switches 554. Since transistor N1 is off, transistors N2 and P2 are on, thereby coupling the 3.3 V on line V2 to cable microcontroller 522 and switches 524.

In this way, host 580 provides a high voltage (12V) to device 590. This higher voltage increases the amount of power that host 580 can provide to device 590. This, in turn, may decrease battery charging times. Device 590, in turn, returns a low voltage (3.3V) to cable circuitry in left plug 520 and right plug 550 in cable 510. That is, the high voltage V1 is not used to directly power any of the cable circuits. Instead, the higher voltage on V1 is reduced by power supply 596 to a lower voltage, which is provided on line V2. This lower voltage then powers the active circuits in left plug 520 and right plug 550.

Again, in some embodiments of the present invention, a host may connect to another host or a self powered device. In such a case, it is desirable for each host or self powered device to power its own corresponding plug. In this way, power does not need to be sent through the cable. An example is shown in the following figure.

Figure 6:
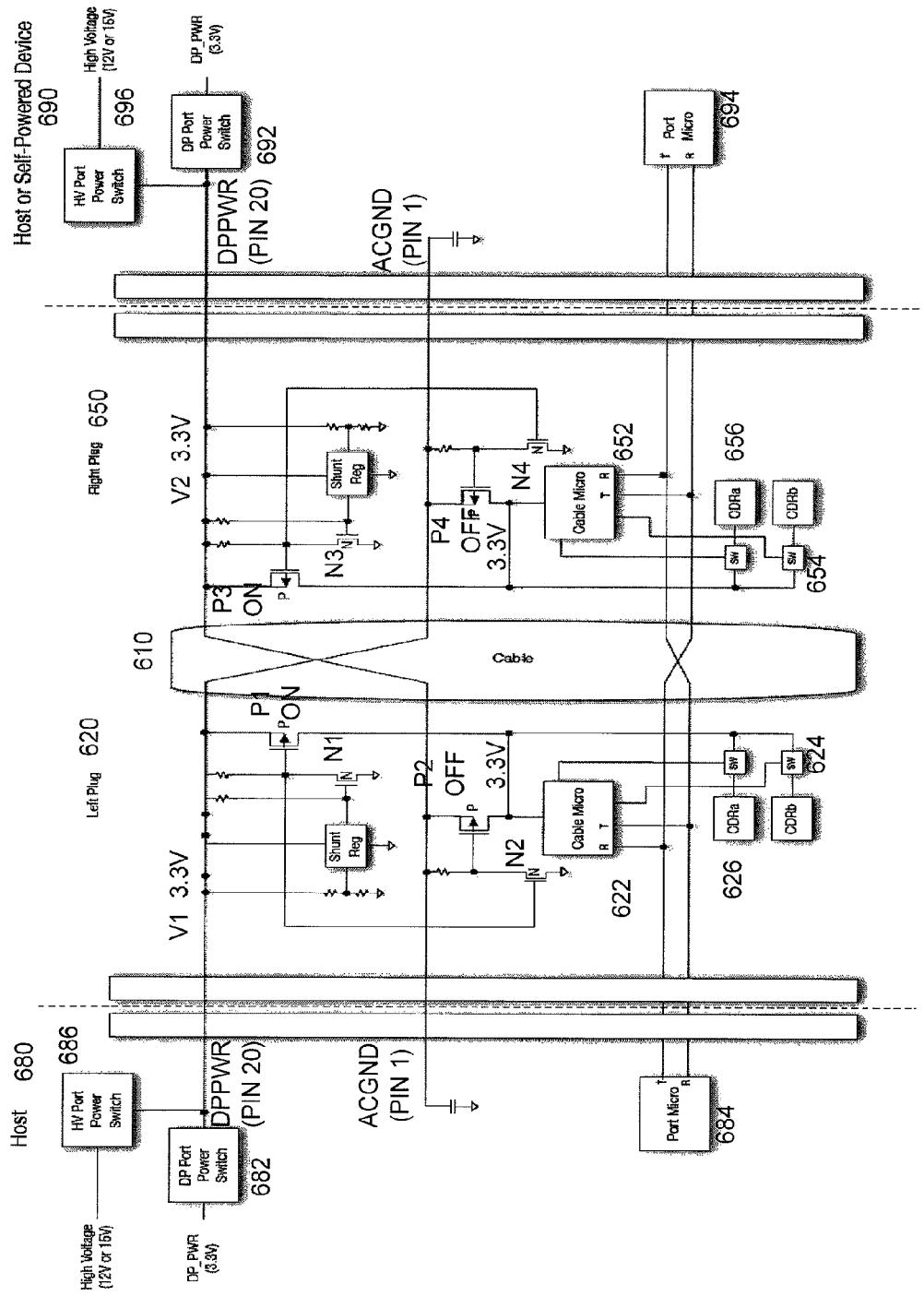
FIG. 6 illustrates an electronic system where a host provides power to a left plug, and a host or self powered device provides power to a right plug.

FIG. 6 illustrates an electronic system where host 680 provides power to left plug 620, and host or self powered device 690 provides power to right plug 650. In this example power switch 682 in host 680 provides 3.3 V on line V1 to left plug 620. This voltage turns on transistors N1 and P1, thereby providing 3.3 V to cable microcontroller 622 and switches 624. Similarly, power switch 692 in host or self powered device 690 provides 3.3 V on line V2 to right plug 650. This voltage turns on transistors N3 and P3, thereby providing 3.3 V to cable microcontroller 652 and switches 654.

A transient condition may occur when left plug 620 is connected to host 680 before right plug 650 is connected to a host or self powered device 690. During this transient condition, the 3.3 V on line V1 may turn on transistors N1 and P1. This may turn on P2 through its body diode, thereby bringing the voltage on line V2 to 2.6 V. When right plug 650 is connected to host or self powered device 690, power switch 692 may provide 3.3 V on line V2, thereby shutting off transistor P2.

In the above embodiments of the present invention, specific circuit configurations are shown. In other embodiments of the present invention, other circuit configurations may be employed. These circuits may be formed using discrete components, they may be partially integrated, or they may be fully integrated. Another specific circuit configuration is shown in the following figures.

Figure 7:
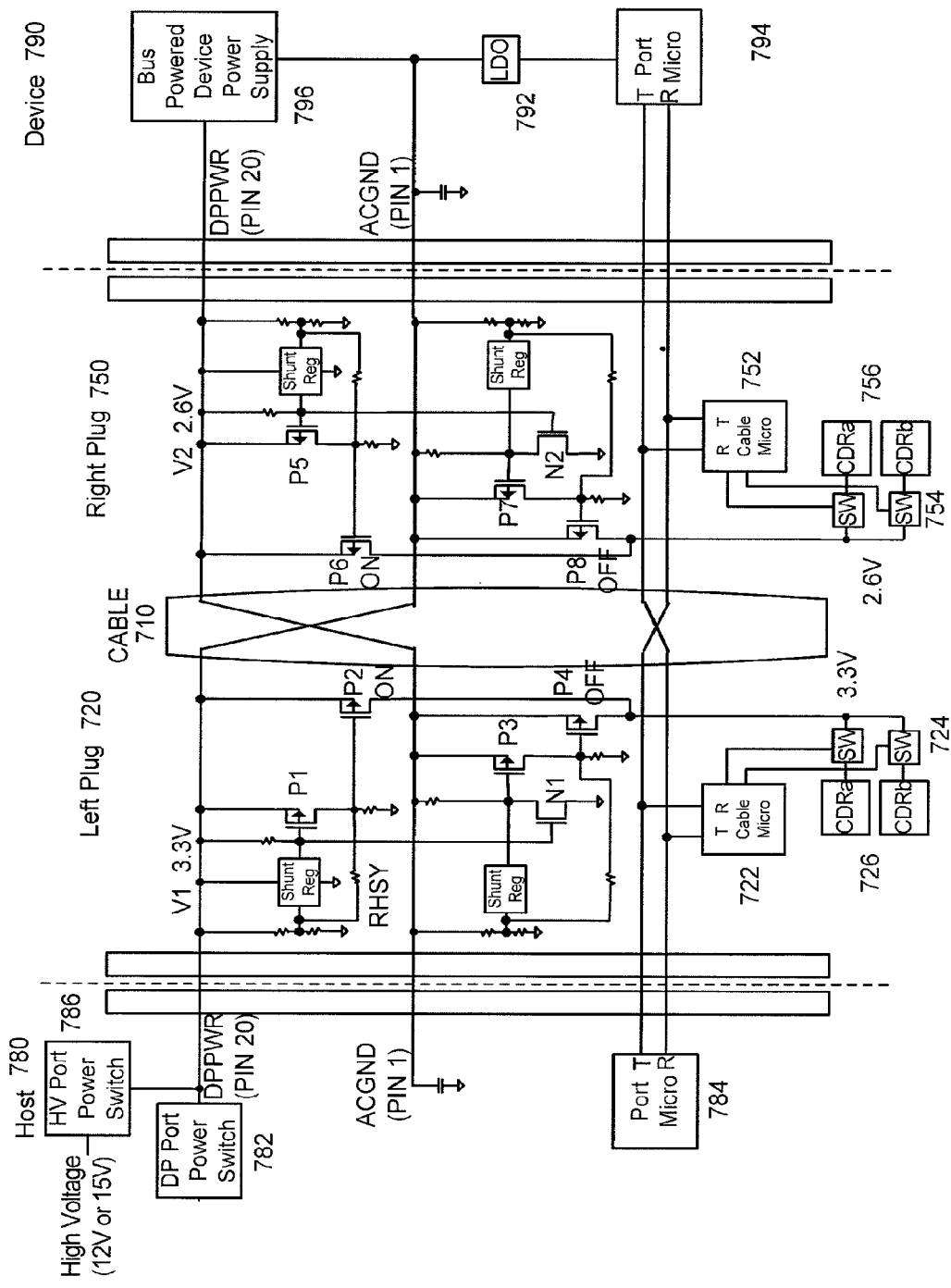
FIG. 7 illustrates another electronic system according to an embodiment of the present invention.

FIG. 7 illustrates another electronic system according to an embodiment of the present invention. In these examples, two shunt regulators are used. Using two shunt regulators may prevent a situation where both a host and a device provide a high voltage, and both plugs connect their circuits to their respective pin 1, even though a high voltage is provided on that pin. Using two shunt regulators means circuits in both plugs may be disconnected and therefore protected from the higher power.

This figure includes host 780 coupled to device 790 via cable 710. Cable 710 includes left plug 724 connected to host 780, and right plug 754 connected to device 790. Host 780 may be capable of providing one or more voltages to both device 790 and cable circuitry in cable 710. Host 780 may provide a lower voltage of 3.3 V, or a higher voltage of 12 or 15 volts. In other embodiments of the present invention, host 780 may provide various voltage levels to host 790 and cable circuitry in cable 710.

In this specific example, host 780 provides 3.3 V to the cable circuitry in cable 710 and device 790. Accordingly, switch 782 in host 780 provides 3.3 V as voltage V1. This voltage pulls up on the gate of transistor P1, thereby turning off transistors P1 and turning on transistor P2. Transistor P2 provides 3.3 V to cable microcontroller 722 and switches 724. This voltage further turns on the body diode of transistor P4, which pulls the voltage on line V2 to 2.6 V, or 3.3 V less one diode drop. This voltage turns off transistor P5 and turns on transistor P6, thereby connecting the voltage on line V2 to cable microcontroller 752 and switches 754. Transistor P8 is off, thereby isolating the voltage on line V2 from the voltage on line V1.

Voltage V1 is received by low-drop-out regulator 792 in device 790, which provides power to port microcontroller 794. Host port microcontroller 784 may then communicate with cable microcontrollers 722 and 752 and device port microcontroller 794 to determine proper configuration for the cable. As before, the host port microcontroller 784 may determine whether higher power levels may be provided, and whether some circuits may need to be powered down.

In this example, power supply 796 receives only 3.3 V on line V1 from host 780. At this voltage, power supply 796 may be in an under-voltage lock-out state, and may therefore be powered off. In this state, power supply 796 does not provide power to the cable circuitry.

Again, host 780 is capable of providing a higher voltage, such as 12 or 15 V. In these circumstances, while it may be desirable to provide this higher voltage to device 790, this higher voltage may cause excess power dissipation, and thus heating, in circuitry of cable 710. Accordingly, in various embodiments of the present invention, while device 790 receives a higher voltage from host 780, device 790 in turn provides a lower voltage to the cable circuitry. This allows cable power dissipation to remain low. Also, by providing the circuitry for generating the lower voltage on device 790, this circuitry does not need to be included in host 780. Accordingly, in circumstances where host 780 does not need to provide this lower voltage, the circuitry is not wasted. Instead, the circuitry is only included on devices that need the higher voltages. An example is shown in the following figure.

Figure 8:
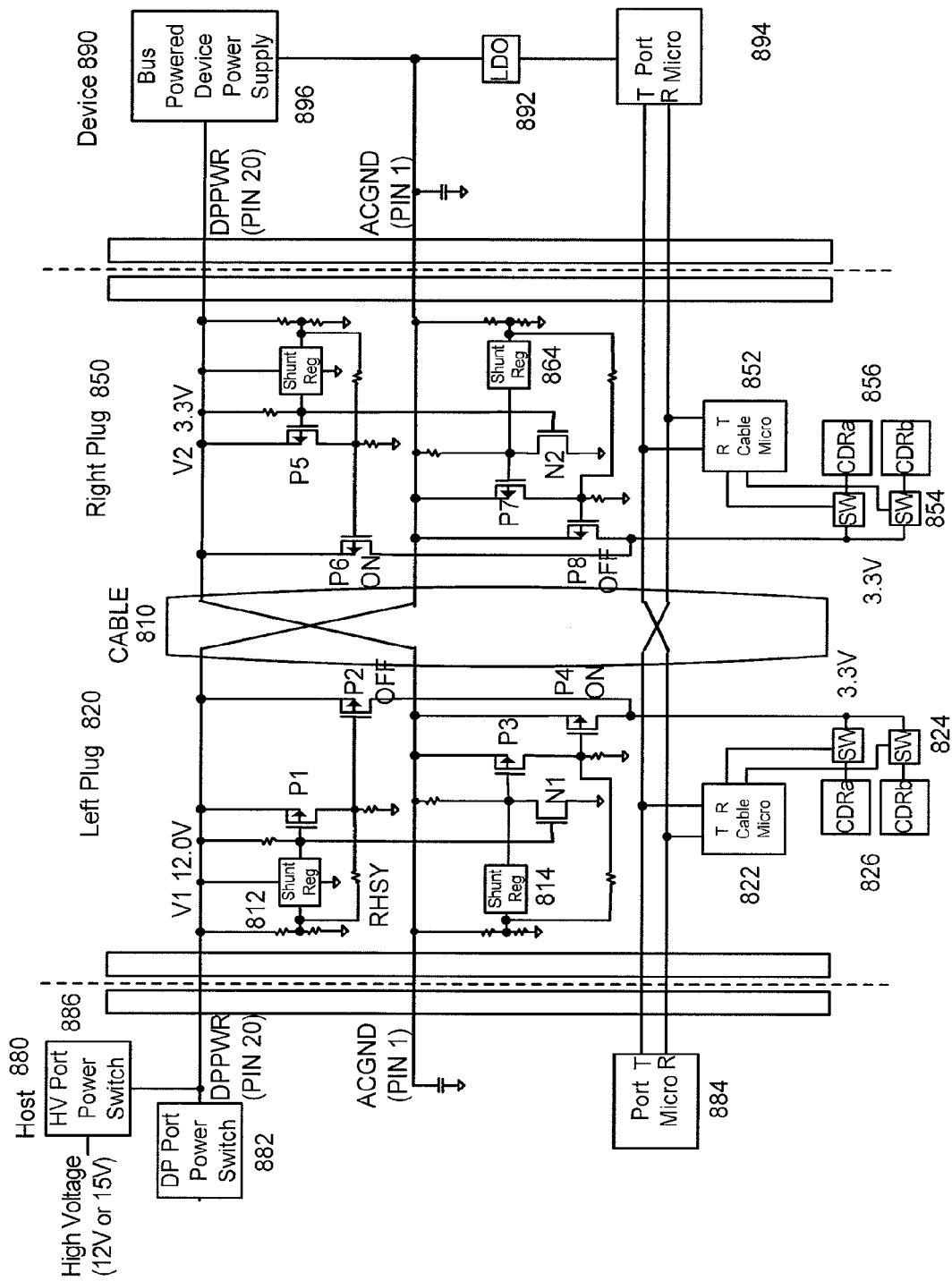
FIG. 8 illustrates another electronic system where a host provides a high voltage to a device via a cable.

FIG. 8 illustrates another electronic system where host 880 provides a high voltage to device 890 via cable 810. Again, providing this high voltage to cable circuitry in cable 810 may cause excessive power dissipation and component heating in left plug 820 and right plug 850. Accordingly, in this embodiment of the present invention, device 890 receives a higher voltage from host 880, and in turn provides a lower voltage to cable circuitry in cable 810. Again, either the higher voltage provided by the host 880, or the lower voltage generated by device 890, may be used to power device 890, charge a battery in or associated with device 890, or used for other purposes.

Specifically, high voltage power switch 886 in host 880 provides 12 V on line V1. This 12 V causes shunt regulator 812 to turn on transistors P1, which turns off transistor P2. The high voltage is received in device 890 by low-drop-out regulator 892, which provides a lower regulated voltage to port microcontroller 894. The higher voltage received by device 890 is regulated to a lower supply, such as 3.3 V, and provided on line V2 by power supply 896. This in turn may turn on transistor P6, which provides the voltage on line V2 to cable microcontroller 852 and switches 854. Since transistors N1 and P3 are off, transistor P4 is on, thereby coupling the 3.3 V on line V2 to cable microcontroller 822 and switches 824.

In this way, host 880 provides a high voltage (12V) to device 890. This higher voltage increases the amount of power that host 880 can provide to device 890. This, in turn, may decrease battery charging times. Device 890, in turn, returns a low voltage (3.3V) to cable circuitry in left plug 820 and right plug 850 in cable 810. That is, the high voltage V1 is not used to directly power these cable circuits. Instead, the higher voltage on V1 is reduced by power supply 896 to a lower voltage, which is provided on line V2. This lower voltage then powers the active circuits in left plug 820 and right plug 850.

Again, if a high voltage is provided on the respective pin 20s by both host 880 and device 890, the additional shunt regulators 814 and 864 may turn off device P4 and P8, respectively. This, in turn, protects the cable circuitry from being connected to the high voltages.

Again, in some embodiments of the present invention, a host may connect to another host or a self powered device. In such a case, it is desirable for each host or self powered device to power its own corresponding plug. In this way, power does not need to be sent through the cable. An example is shown in the following figure.

Figure 9:
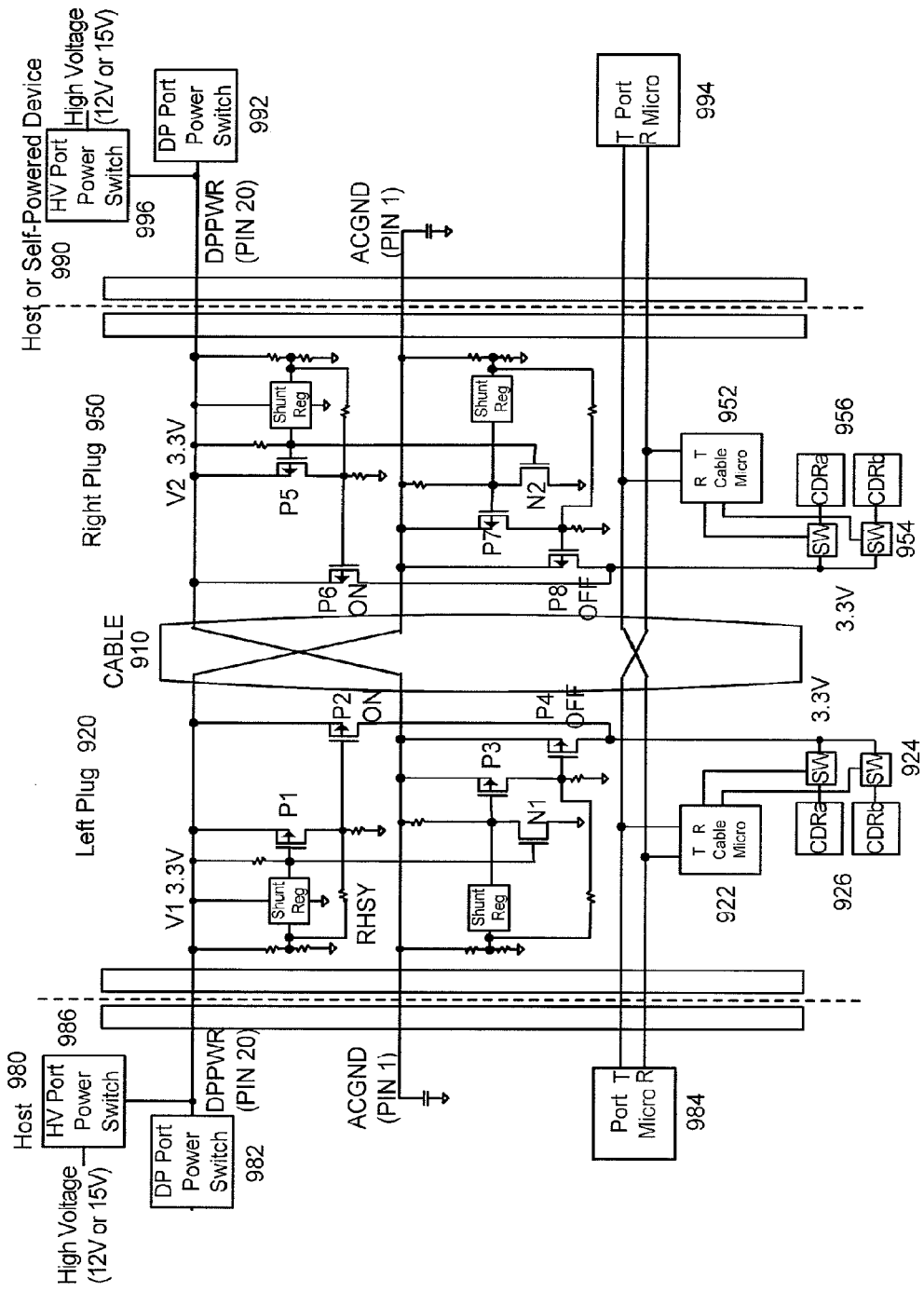
FIG. 9 illustrates another electronic system where a host provides power to a left plug, and a host or self powered device provides power to a right plug.

FIG. 9 illustrates another electronic system where host 980 provides power to left plug 920, and host or self powered device 990 provides power to right plug 950. In this example power switch 982 in host 980 provides 3.3 V on line V1 to left plug 920. This voltage turns on transistor P1, thereby providing 3.3 V to cable microcontroller 922 and switches 924. Similarly, power switch 992 in host or self powered device 990 provides 3.3 V on line V2 to right plug 950. This voltage turns on transistor P6, thereby providing 3.3 V to cable microcontroller 952 and switches 954.

A transient condition may occur when left plug 920 is connected to host 980 before right plug 950 is connected to a host or self powered device 990. During this transient condition, the 3.3 V on line V1 may turn on transistor P1. This may turn on P4 through its body diode, thereby bringing the voltage on line V2 to 2.6 V. When right plug 950 is connected to host or self powered device 990, power switch 992 may provide 3.3 V on line V2, thereby shutting off transistor P4 and reducing its body diode current.

Again, in various embodiments of the present invention, various circuit configurations may be used. In this and other embodiments, shunt regulators may be used. These shunt regulators may receive a voltage, provided in the above examples by a resistor divider. This received voltage is compared to an internal reference voltage. If the received voltage is higher than the reference, an output transistor may conduct; if the received voltage is lower than the reference, an output transistor may be off. For example, in FIG. 7, the voltage on line V1 is only 3.3V, and the received voltage is less than the reference. In this case, the output transistor in the shunt regulator is off, and P1 is off, which turns on P2. In FIG. 8, the voltage on line V1 is 12V, and the received voltage is higher than the reference. In this case, the output transistor in the shunt regulator is on, and P1 is on, which turns off P2.

With the above configurations, if received power is below a threshold, the received power is used to power both plugs if the sink device is not self-powered. If the received power is above the threshold the received power is used by the sink device to generate a voltage to power the active circuitry in the plugs. If the sink device is self-powered, each device can power its own plug. In various embodiments of the present invention, various numbers of these regulators may be used, and they may be placed in various locations.

In these and other embodiments of the present invention, hysteresis may be included to reduce chattering and the possibility of oscillations. For example, resistors Rhys have been added to the circuits in FIGS. 7-9 to provide hysteresis to the above threshold where the various states are entered.

Embodiments of the present invention may include circuits to receive and retime data. For example, one of more clock and data recovery circuits 926 and 956 may be included in either or both of the plugs 920 and 950. Clock and data recovery circuits 926 in left plug 920 may receive signals from host 980 and provide them to the clock and data recovery circuits 966 in the right plug 950. Similarly, clock and data recovery circuits 956 in right plug 950 may receive signals from device 990 and provide them to the clock and data recovery circuits 926 in the left plug 920. In various embodiments of the present invention, one or two lanes of bidirectional traffic may be provided by the clock and data recovery circuits 926 and 956. Examples of this can be found in co-pending U.S. patent application Ser. No. 13/173,739, titled Circuitry for Active Cable, which is incorporated by reference.

In these examples, a switch is shown as being coupled to each of two clock and data recovery circuits in each plug. In other embodiments of the present invention, only one switch may be connected to two clock and data recovery circuits. When one clock and data recovery circuit is not needed, it may be powered down via software instead of a physical switch. In other embodiments of the present invention, other power management techniques may be used.

In various embodiments of the present invention, much of the configuration of the cable circuitry is controlled using the port microcontrollers 984 and 994, and cable microcontrollers 922 and 952. These microcontrollers may be connected to each other using signals that originate on the LSR2P TX and LSP2R RX pins. These pins may be referred to as the LSx bus.

This bus may convey signals that turn off circuitry associated with unused channels or lanes, that determine the presence of a connection, and that may negotiate for higher voltages. For example, the presence of a connection may be facilitated by each endpoint (host or device) having a weak (1 MΩ) pull-down on the LSP2R RX pin and a stronger (10 KΩ) pull-up on the LSR2P TX pin. Since the cable crosses over from end-to-end, each end can sense its P2R signal to determine whether there is a powered host or device on the far side, and continue to allow power management when the cable is not fully connected. Also, if a device requires that a higher voltage be provided by a host, the device may request the increase in voltage using the LSx bus.

Again, in various embodiments of the present invention, the cable microcontrollers may be in communication with the port microcontrollers in hosts and devices that are communicating over the cable. In a specific embodiment of the present invention, a port microcontroller in a first device may communicate directly with a cable microcontroller in the plug inserted in the first device, as well as a port microcontroller in a remote device attached to the remote plug. Further communication may be had with the remote or far-end plug by "bouncing" messages of the port microcontroller in the remote device.

These communications between port and cable microcontrollers may take various forms. Traditionally, interconnections were fixed at each end, with little opportunity for discovery of improved capabilities or flexible implementations. Accordingly, embodiments of the present invention provide this ability to communicate, such that, for example, a cable may share information regarding its features to a host or device, and the host or device may utilize such features.

In other examples, these communications between the various port and cable microcontrollers may be diagnostic in nature. These diagnostic communications may aid in the isolation of faults, by an end user or other, which may allow rapid remediation of issues and may focus attention on devices causing the fault. These communications may be useful in test and manufacturing as well. They may also be used to optimize the configuration for power savings, for example, a channel that is not used may be powered down, a low-power remote device may be powered by a host, such that the device does not require a connection to a wall-outlet. Also, power consumed by remote devices may be monitored, and power increases (or decreases) may be enabled as needed. They may also allow devices to continue to operate despite various impairments. They may also enable the use of either copper or other conductor, or fiber optics in the cable itself. Further examples of this can be found in co-pending U.S. patent application Ser. No. 13/173,739, titled Circuitry for Active Cable, which is incorporated by reference.

In these embodiments of the present invention, cable microcontrollers 922 and 952 control switches 924 and 954, which connect or disconnect power to and from clock and data recovery circuits 926 and 956. Cable microcontrollers 922 and 952 and clock and data recovery circuits 926 and 956 consume power, which may discharge a battery over time or otherwise waste power. Accordingly, when these circuits are not needed, they may be powered down. For example, if only one data link in cable 910 is used, one set of clock and data recovery circuits 926 and 956 may be disabled by cable microcontrollers 922 and 952. Also, if no data is being transferred from host 982 device 990, circuits in the left plug 920 and right plug 950 may be turned off to save power. An example is shown in the following figure.

Figure 10:
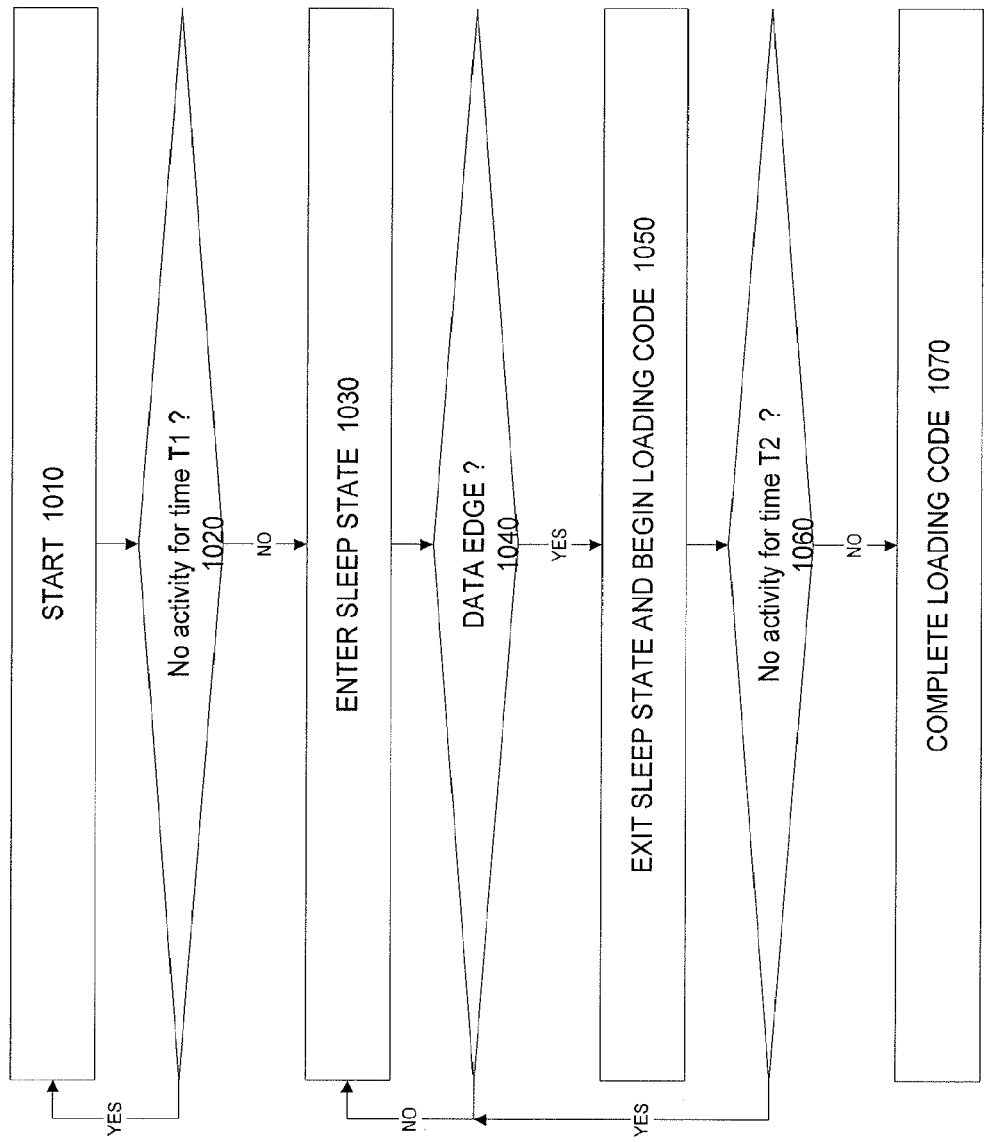
FIG. 10 illustrates a method of conserving power according to an embodiment of the present invention.

FIG. 10 illustrates a method of conserving power according to an embodiment of the present invention. After a power-up, reset, or other start event 1010, it is determined in act 1020 whether there has been no data activity through the cable for a time T1. If there has not been activity, a low-power sleep state may be entered in act 1030. In act 1040, it is determined whether there has been a data edge, for example on a low speed or high-speed input. If there has been a data edge, the sleep state may be exited and code needed for operation of the cable may begin being loaded in act 1050. On occasion, such an edge may be a noise transient. Such an edge might not be followed by any further activity. In this case, the sleep state may be reentered in act 1030. If there is activity within the time T2 (act 1060), the remainder of the code may be loaded in act 1070, and or normal operation resumed.

Again, connectors and cables consistent with embodiments of the present invention may be able to handle two or more signal protocols. In a specific embodiment of the present invention, two protocols are DisplayPort and a high-speed protocol HSIO, which in the following example is referred to as T29. Accordingly, when devices are connected together using a cable consistent with embodiments of the present invention, a determination is made by a port microcontroller, such as port microcontroller 984, as to which protocol is being used. An example of how this determination is made is shown in the following figure.

Figure 11:
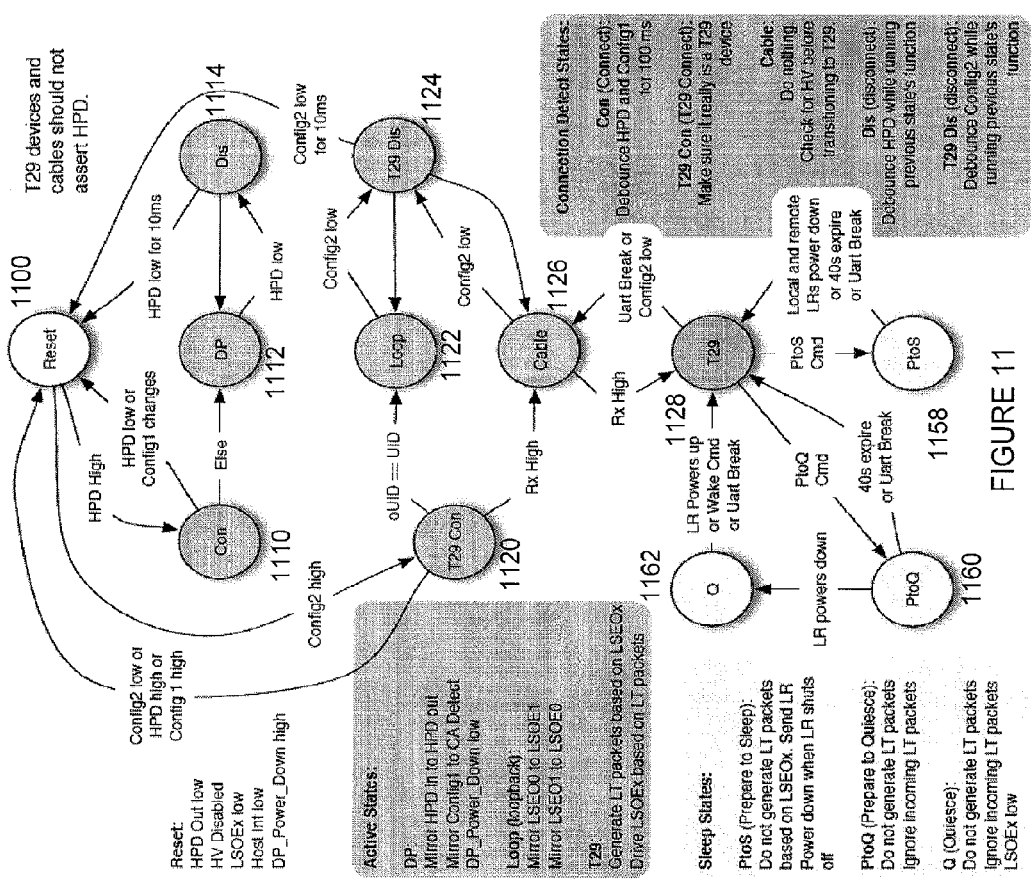
FIG. 11 illustrates a state machine that may be used in configuring a data link according to an embodiment of the present invention.

FIG. 11 illustrates a state machine that may be used in configuring a data link according to an embodiment of the present invention. In a specific embodiment of the present invention, these determinations may be made by a port microcontroller, such as port microcontroller 984, or other microcontroller or state machine.

After a power up or reset condition, the reset state 1100 is entered. In general, the presence of a DisplayPort link is detected by a high pull-up on hot plug detect line HPD. Accordingly, if hot plug detect is sensed as high, a connect state 1110 is entered. At this point, it is determined whether the high state is maintained for a period of time, for example, 100 ms. This determination has the effect of debouncing the voltage on the HPD line. If this high state is maintained, the DisplayPort state 1112 may be entered. If there is a low signal on the hot plug detect line, reset stage 1100 is reentered. The port microcontroller may remain in DisplayPort state 1112 until the hot plug detect returns low. In this case, the disconnect state 1114 is entered.

Disconnect state 1114 provides an amount of hysteresis to prevent DisplayPort state 1112 from being exited prematurely. For example, DisplayPort provides for second interrupts via the HPD pin. These interrupts may be high-low-high pulses on HPD lasting for less than 1 ms. These interrupts should not be seen as a disconnect, and providing this hysteresis (the 10 ms delay) prevents this. Accordingly, if hot plug detect remains low for 10 ms, the reset stage 1100 is reentered, otherwise DisplayPort state 1112 is re-entered.

Also, in general, the presence of a T29 connection is determined by a configuration pin CONFIG2 (identified elsewhere as CFG2) being high. When this is true, reset state 1100 is exited and T29 connect state 1120 is entered. A loopback state 1122 may be entered by passing a unique ID from an input to an output. If CONFIG2 returns low, T29 disconnect state 1124 may be entered. As with the disconnect state 1114, T29 disconnect state 1124 provides an amount of hysteresis, and prevents an early exit from a T29 connect state.

Once in T29 connect state 1120, if data is received, cable state 1126 is entered. Once cable state 1126 is entered, if data is again received, the T29 state 1128 is entered. Cable state 1126 and cable state 1128 may be exited if CONFIG2 returns low, as shown.

As described above, in various embodiments of the present invention, various sleep states may be entered. For example, a command may be received instructing the port microcontroller to prepare to sleep or prepare to enter a quiescence state, whereupon states 1158 or 1160 are entered.

In the above example, as the supplied power ramps up from a low voltage to a high voltage, there may be a time where P2 in FIG. 8 turns off because the shunt threshold has been crossed, but device 890 does not yet have enough voltage to provide 3.3V to it's pin 20. As a result the cable "browns-out," and CONFIG2 may drop. It may be undesirable to detect this as disconnect. Accordingly, once serial communications have been done successfully CONFIG2 becomes a don't-care and only a UART break may be detected as a disconnect. An example is shown in the following figure.

Figure 12:
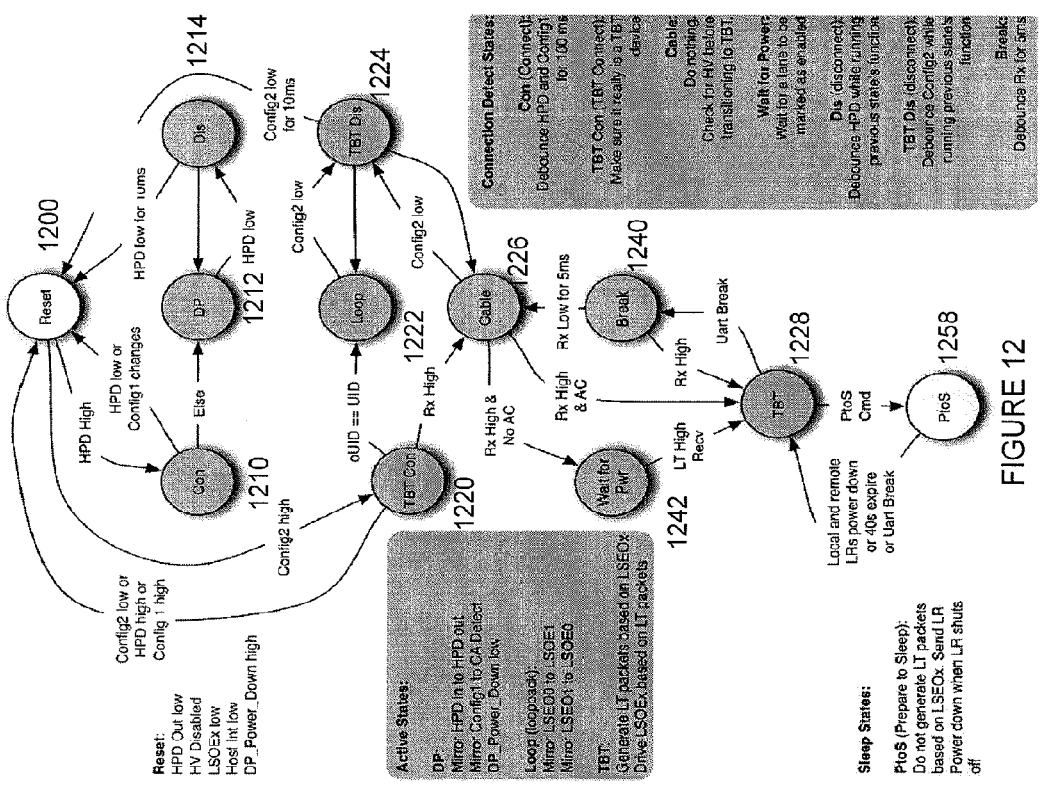
FIG. 12 illustrates another state machine that may be used in configuring a data link according to an embodiment of the present invention.

FIG. 12 illustrates a state machine that may be used in configuring a data link according to an embodiment of the present invention. In a specific embodiment of the present invention, these determinations may be made by a port microcontroller, such as host port microcontroller 984, or other microcontroller or state machine.

After a power up or reset condition, the reset state 1200 is entered. In general, the presence of a DisplayPort link is detected by a high pull-up on hot plug detect line HPD. Accordingly, if hot plug detect is sensed as high, a connect state 1210 is entered. At this point, it is determined whether the high state is maintained for a period of time, for example, 100 ms. This determination has the effect of debouncing the voltage on the HPD line. If this high state is maintained, the DisplayPort state 1212 may be entered. If there is a low signal on the hot plug detect line, reset stage 1200 is reentered. The port microcontroller may remain in DisplayPort state 1212 until the hot plug detect returns low. In this case, the disconnect state 1214 is entered.

Disconnect state 1214 provides an amount of hysteresis to prevent DisplayPort state 1212 from being exited prematurely. For example, DisplayPort provides for second interrupts via the HPD pin. These interrupts may be high-low-high pulses on HPD lasting for less than 1 ms. These interrupts should not be seen as a disconnect, and providing this hysteresis (the 10 ms delay) prevents this. Accordingly, if hot plug detect remains low for 10 ms, the reset stage 1200 is reentered, otherwise DisplayPort state 1212 is re-entered.

Also, in general, the presence of a T29 (or TBT) connection is determined by a configuration pin CONFIG2 (identified elsewhere as CFG2) being high. When this is true, reset state 1200 is exited and TBT (identified elsewhere as T29) connect state 1220 is entered. A loopback state 1222 may be entered by passing a unique ID from an input to an output. If CONFIG2 returns low, TBT disconnect state 1224 may be entered. As with the disconnect state 1214, TBT disconnect state 1224 provides an amount of hysteresis, and prevents an early exit from a TBT connect state.

Once in TBT connect state 1120, if data is received, cable state 1226 is entered. Once cable state 1226 is entered, if data is again received, the TBT state 1228 is entered. Once TBT state 1228 is entered, it is exited by a UART break, and the Break state 1240 is entered. Again, in this embodiment of the present invention, TBT state 1228 is not exited by the loss of the pull-up on CONFIG2. If data is not received in 5 ms, the cable state 1226 is entered. If data is received, the TBT state 1228 may be reentered. Also, in this embodiment, one or more lanes may not be enabled for TBT data transmission. In this case, when in the cable state 1226, a wait for power state 1242 may be entered until the lane or channel is enabled.

Again, in various embodiments of the present invention, various sleep states may be entered. For example, a command may be received instructing the port microcontroller to prepare to sleep or prepare to enter a quiescence state, whereupon state 1258 is entered.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A cable apparatus comprising:
   a cable;
   a first plug coupled to a first end of the cable and comprising:
     a first active circuit including clock and data recovery circuits to receive and retime data, and to provide the retimed data; and
   a second plug coupled to a second end of the cable and comprising:
     a second active circuit including clock and data recovery circuits to receive and retime data, and to provide the retimed data; and
   wherein a first supply voltage is received at the first plug and provided at the second plug to a device, the device converts the first supply voltage to a second supply voltage and provides the second supply voltage to the second plug, and
   wherein the second supply voltage powers the first active circuit in the first plug and the second active circuit in the second plug.

2. The cable apparatus of claim 1 wherein the first supply voltage is received from a host device.

3. The cable apparatus of claim 2 wherein the second supply voltage is received from a regulator.

4. The cable apparatus of claim 3 wherein the second supply voltage is at least approximately 3.3 Volts.

5. The cable apparatus of claim 1 wherein the first active circuit and the second active circuits each further comprise a microcontroller.

6. The cable apparatus of claim 1 wherein the first plug further comprises a shunt regulator.

7. A cable apparatus comprising:
   a cable;
   a first plug having a first terminal to receive a first power supply from a host and a second terminal to receive a second power supply, and
   a second plug having a second terminal to receive the first power supply through the cable from the host and a first terminal to receive the second power supply,
   wherein the first terminal in the first plug is coupled through the cable to the second terminal in the second plug, and the second terminal in the first plug is coupled through the cable to the first terminal in the second plug,
   wherein the first plug further comprises:
     a first active circuit, wherein the first active circuit may be powered by the first power supply, a portion of the first power supply, or the second power supply.

8. The cable apparatus of claim 7 wherein the second plug further comprises:
   a first circuit to selectively couple the second power supply received on the first terminal to a second active circuit in the second plug; and
   a second circuit to selectively couple at least a portion of the first power supply to the second terminal.

9. The cable apparatus of claim 8 wherein when a first power supply is received at the first terminal in the first plug, and the first power supply is below a threshold, then a first circuit in the first plug couples the first power supply to the first active circuit; and the second circuit in the first plug couples at least a portion of the first power supply to the second terminal.

10. The cable apparatus of claim 9 wherein when a first power supply is received at the first terminal in the first plug, and the first power supply is above the threshold, then a second power supply is received at the first terminal in the second plug, the first circuit in the second plug couples the second power supply to the second active circuit and the second terminal in the second plug, and the second circuit in the first plug couples the second power supply to the first active circuit.

11. The cable apparatus of claim 8 wherein the second power supply is received from the second device.

12. The cable apparatus of claim 11 wherein the first active circuit and the second active circuit comprise clock and data recovery circuits.

13. A method of providing power to cable circuitry comprising:
    receiving a first supply voltage from a first device at a first plug of a cable, and if power is provided through the cable from the first device to a second device at a second plug of the cable, the first plug and the second plug at opposite ends of the cable, and the first supply voltage is below a first threshold, then powering first active circuitry in the first plug with the first supply voltage, and powering second active circuitry in the second plug with at least a part of the first voltage,
    if power is provided from the first device to the second device and the first supply voltage is above the first threshold, then generating a second supply voltage from the first supply voltage in the second device, and powering the first active circuitry and the second active circuitry with the second supply voltage, and
    if power is not provided from the first device to the second device, then receiving a second power supply voltage at the second plug from the second device, and powering the first active circuitry with the first power supply voltage and powering the second active circuitry with the second power supply voltage.

14. The method of claim 13 wherein the first active circuit and the second active circuits comprise clock and data recovery circuits.

15. The method of claim 14 wherein the first device is a host device.

16. The method of claim 13 wherein the first active circuit and the second active circuits each further comprise a microcontroller.

\* \* \* \* \*